(12) United States Patent
Chen et al.

(10) Patent No.: US 11,370,908 B2
(45) Date of Patent: Jun. 28, 2022

(54) CURABLE COMPOSITIONS AND RELATED METHODS

(71) Applicant: 3M INNOVATIVE PROPERTIES COMPANY, St. Paul, MN (US)

(72) Inventors: Lianzhou Chen, Woodbury, MN (US); Dmitriy Salnikov, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 17/052,430

(22) PCT Filed: Jun. 25, 2019

(86) PCT No.: PCT/IB2019/055343
§ 371 (c)(1),
(2) Date: Nov. 2, 2020

(87) PCT Pub. No.: WO2020/003122
PCT Pub. Date: Jan. 2, 2020

(65) Prior Publication Data
US 2021/0102061 A1   Apr. 8, 2021

Related U.S. Application Data

(60) Provisional application No. 62/690,848, filed on Jun. 27, 2018.

(51) Int. Cl.
*C08L 63/00*       (2006.01)
*C09J 7/35*        (2018.01)
(Continued)

(52) U.S. Cl.
CPC ............ *C08L 63/00* (2013.01); *C08G 59/245* (2013.01); *C08G 59/38* (2013.01);
(Continued)

(58) Field of Classification Search
CPC ............ C09J 181/06; C09J 163/00–10; C08L 63/00–10; C09D 163/00–10
See application file for complete search history.

(56) References Cited

U.S. PATENT DOCUMENTS 3,018,262 A   1/1962  Schroeder
3,298,998 A   1/1967  McConnell
(Continued)

FOREIGN PATENT DOCUMENTS

WO   WO 2016/100365   6/2016
WO   WO 2018/125692   7/2018
WO   WO 2019/027746   2/2019

OTHER PUBLICATIONS

Araldite® PY 306—Huntsman—datasheet, 2 pages, Dec. 18, 2017.
(Continued)

*Primary Examiner* — Kregg T Brooks
(74) *Attorney, Agent, or Firm* — Philip P. Soo

(57) ABSTRACT

Provided is a curable composition containing a reactive mixture of components including an polyethersulfone having a chemical group reactive with an epoxide, a cycloaliphatic polyepoxide resin, a polyepoxide having a functionality greater than two, a liquid diepoxide resin, a first curative containing 9,9-bis(aminophenyl)fluorene or a derivative therefrom and having a curing onset temperature of from 150° C. to 200° C. The components can further comprise a second curative having a curing onset temperature of from 60° C. to 180° C. When thermally curing this composition, the second epoxy curative starts to cure before the first epoxy curative, thereby inhibiting vertical flow of the adhesive during the curing process.

10 Claims, 2 Drawing Sheets

(51) Int. Cl.
  *C08G 59/24* (2006.01)
  *C08G 59/38* (2006.01)
  *C08G 59/50* (2006.01)
  *C08G 59/60* (2006.01)
  *C08G 75/029* (2016.01)
  *C08K 3/08* (2006.01)
  *C08K 5/18* (2006.01)
  *C08L 81/06* (2006.01)
  *C08G 59/40* (2006.01)

(52) U.S. Cl.
  CPC ..... *C08G 59/4021* (2013.01); *C08G 59/5033* (2013.01); *C08G 59/5073* (2013.01); *C08G 59/60* (2013.01); *C08G 75/029* (2013.01); *C08K 3/08* (2013.01); *C08K 5/18* (2013.01); *C08L 81/06* (2013.01); *C09J 7/35* (2018.01); *C08G 2170/00* (2013.01); *C08K 2003/0812* (2013.01); *C08L 2205/035* (2013.01); *C08L 2207/53* (2013.01); *C08L 2312/00* (2013.01); *C09J 2203/35* (2020.08); *C09J 2463/00* (2013.01); *C09J 2481/00* (2013.01)

(56) References Cited

U.S. PATENT DOCUMENTS

| | | | |
|---|---|---|---|
| 3,647,751 | A | 3/1972 | Darsow |
| 3,923,946 | A * | 12/1975 | Meyer ................ C22C 32/0094 |
| | | | 419/48 |
| 4,175,175 | A | 11/1979 | Johnson |
| 4,320,047 | A * | 3/1982 | Murphy ................ C08K 3/36 |
| | | | 523/457 |
| 4,684,678 | A | 8/1987 | Schultz |
| 6,624,213 | B2 | 9/2003 | George |
| 2009/0298969 | A1 | 12/2009 | Attarwala |
| 2011/0048637 | A1 | 3/2011 | Kohli |
| 2016/0168372 | A1 | 6/2016 | Bonneau |
| 2017/0253779 | A1* | 9/2017 | Schlechte ............... C09J 11/04 |

OTHER PUBLICATIONS

Lee, et al., "Epoxy Resins" McGraw Hill, New York, 1957, p. 110.
Super Engineering Plastics, SUMIKAEXCEL PES | Product Information | High-Perform, 2 pages, https//www.sumitomo-chem.co.jp/sep/English/products/pes retrieved Sep. 10, 2019.
Tactix® 556—Huntsman—datasheet, 2 pages, Sep. 10, 2019.
ISR for PCT/IB2019/055343, 5 pages, Oct. 18, 2019.

* cited by examiner

CURABLE COMPOSITIONS AND RELATED METHODS

CROSS REFERENCE TO RELATED APPLICATIONS

This application is a national stage filing under 35 U.S.C. 371 of PCT/IB2019/055343, filed Jun. 25, 2019, which claims the benefit of U.S. Provisional Patent Application No. 62/690,848, filed Jun. 27, 2018, the disclosures of which are incorporated by reference in their entirety herein.

FIELD OF THE INVENTION

Provided are curable compositions for adhesive bonding applications. The provided curable compositions can, for example, be used as film adhesive in industrial bonding applications.

BACKGROUND

The evolution of adhesives used to bond aerospace structures continues as aircraft manufacturers replace traditional metallic substrates with lighter weight composite materials. Use of composite materials has increased the complexity of bonding applications, since aircraft components now include a wide spectrum of metals, metal alloys, polymers, ceramics, and hybrid materials. The need for high-performance adhesives has been driven by the increased use of honeycomb sandwich panels that offer high strength at a very low weight. Because of structural limitations in honeycomb materials, mechanical fastening is not a preferred joining option. However, use of structural adhesives is the preferred way to reliably and economically attach honeycombs to face sheets in the process of building honeycomb sandwich panels while maintaining and preserving weight/strength ratio benefits.

An ideal adhesive should provide long-term durability and meet specific challenges for metal, composite solid panel and honeycomb sandwich constructions, where high modulus, high fracture toughness and peel strength are required. Such adhesives should be capable of bonding monolithic composite and metallic panels as well as honeycomb sandwich structures, and be compatible with commonly encountered substrates, surface preparation techniques, and primers. When properly deployed, structural adhesive films can help significantly reduce the number of mechanical fasteners required.

Curable adhesive films can provide an efficient and economical way to bond these structures. These adhesive films can also be provided in a variety of coat weights and constructions, including unsupported, woven or un-woven carriers supported constructs to minimize weight while maintaining structural integrity and facilitating desirable application handling characteristics.

It is common for structural adhesive films to be thermally cured at temperatures ranging from 80° F. (82° C.) to 385° F. (196° C.). Compared with liquid and paste adhesives, adhesive films are less messy and do not require mixing and offer easy handling, thereby improving efficiency in the adhesive application process. These features make adhesive films more convenient and easier to use than liquid and paste adhesives.

SUMMARY

Structural adhesives used in fabricating honeycomb structures should form a good fillet around honeycomb walls where they contact the skins for optimal structure performance. In a simplistic sandwich structure, a skin is positioned against a tool surface with a structural adhesive deposited on top, followed by a honeycomb layer, and then another layer of structural adhesive and followed by second skin. It is evident what at least one skin to honeycomb interface is cured upside down. Depending on the shape of the sandwich structure, the joint between the skin and honeycomb structure might be oriented vertically or out of plane. The ability of the structural adhesive to flow is an integral part of its ability to be able to form optimal fillet at the skin-honeycomb interface. At the same time some level of flow control is highly desirable to facilitate curing in the configurations described above.

One of the shortcomings of conventional film adhesives is the tendency for these materials to sag when mounted on vertical or out-of-plane surfaces and subsequently heated during the curing process. This problem can be aggravated by the presence of high density fillers, which are often compounded into the uncured adhesive composition to enhance strength or other properties of these adhesive films. Sagging of the adhesive, if significant, can adversely affect bond performance and is considered undesirable.

The provided curable compositions include an epoxide-reactive polyethersulfone, a cycloaliphatic polyepoxide resin, a polyepoxide having a functionality greater than two, a liquid diepoxide resin, and a first epoxy curative comprising 9,9-bis(aminophenyl)fluorene and having a curing onset temperature of from 150° C. to 200° C. In some embodiments, the curable composition further includes a second epoxy curative having a curing onset temperature that is significantly lower than that of the 9,9-bis(aminophenyl) fluorene curative. Activity of the second epoxy curative can be beneficial during the process of thermally curing the composition.

As the temperature increases, the second epoxy curative starts to cure before the first epoxy curative, thereby reducing or eliminating undesirable flow of the adhesive during the curing process. It was further observed that pre-reaction of the polyepoxide resins and epoxy reactive polyethersulfone, and optionally core-shell rubber tougheners, can provide a structural film adhesive that has both good toughness and a high degree of adhesion to a variety of substrates. These structural film adhesives can be made either by hot melt method or by solvent coating method. Further, these film adhesives can yield a very high overlap shear and peel performance at temperatures ranging from 25° C. to 204° C. The adhesive can be used in metal and composite bonding.

In one aspect, a curable composition is provided. The curable composition comprises a reactive mixture of components comprising: an polyethersulfone having a chemical group reactive with an epoxide; a cycloaliphatic polyepoxide resin; a polyepoxide having a functionality greater than two; a liquid diepoxide resin; and a first curative having a curing onset temperature of from 150° C. to 200° C. and comprising 9,9-bis(aminophenyl)fluorene or a derivative therefrom. The components further comprise a second curative having a curing onset temperature of from 60° C. to 180° C., the second curative comprising a dicyandiamide and imidazole.

In a second aspect, an adhesive film is provided, comprising the aforementioned curable composition.

In a third aspect, a method of bonding the aforementioned adhesive film to a substrate is provided, the method comprising: applying the adhesive film to the substrate; heating the adhesive film to a temperature above the curing onset temperature of the second curative to partially cure the adhesive film; and further heating the adhesive film to a temperature above the curing onset temperature of the first curative to fully cure the adhesive film.

DEFINITIONS

Figure 1:
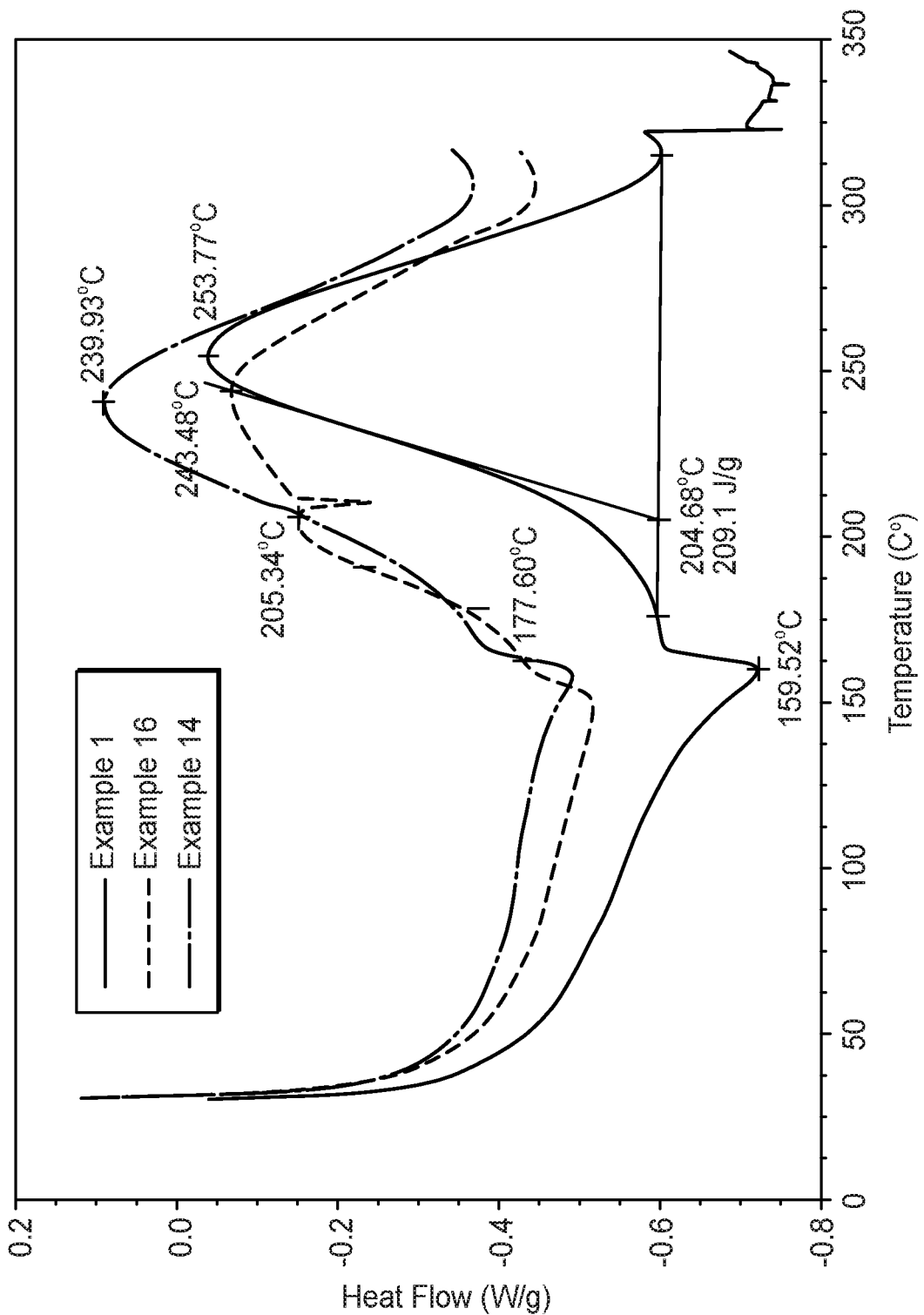
FIG. 1 is a differential scanning calorimetry trace characterizing curable compositions according to various embodiments.

"Amino" refers to a chemical group containing a basic nitrogen atom with a lone pair (—NHR), and may be either a primary or secondary chemical group.

"Average" generally refers to a number average but may, when referring to particle diameter, either represent a number average or volume average.

"Cure" refers to exposing to radiation in any form, heating, or allowing to undergo a physical or chemical reaction that results in hardening or an increase in viscosity. Materials can be cured by heating or otherwise exposing to actinic radiation.

"Curing onset temperature" refers to the temperature above which a given curative in a curable composition induces curing in the curable composition, as measured by differential scanning calorimetry at a scan rate of +10° C. per minute.

"Fully cure" refers to curing to an extent sufficient for the cured material to be used in its intended application.

"Halogen" group, as used herein, means a fluorine, chlorine, bromine, or iodine atom, unless otherwise stated.

"Partially cure" means curing to an extent that is measurable but insufficient for the cured material to be used in its intended application.

"Particle diameter" represents the largest transverse dimension of the particle.

"Polymer" refers to a molecule having at least one repeating unit and can include copolymers.

"Substituted" as used herein in conjunction with a molecule or an organic group as defined herein refers to the state in which one or more hydrogen atoms contained therein are replaced by one or more non-hydrogen atoms.

DETAILED DESCRIPTION

Reference will now be made in detail to various embodiments of the disclosed subject matter. While the disclosed subject matter will be described in conjunction with the enumerated claims, it will be understood that the exemplified subject matter is not intended to limit the claims to the disclosed subject matter.

The terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for description only and not of limitation. Any use of section headings is intended to aid reading of the document and is not to be interpreted as limiting; information that is relevant to a section heading may occur within or outside of that section.

Provided herein are curable compositions that can be suitable for use in adhesive films and potentially other adhesive compositions. The provided curable compositions include a reactive mixture of components. In exemplary embodiments, this mixture of components includes a polyethersulfone having a chemical group reactive with an (poly)epoxide, polyepoxide resins, and a sufficient amount of a suitable curative or mixture of curatives.

Aspects of these components are described in more detail in the sections that follow.

Polyethersulfones

The provided curable compositions include one or more polyethersulfones. Polyethersulfones are thermoplastics capable of tolerating extreme temperatures in dry and moist environments for prolonged periods without distorting or degrading. In addition to having a high degree of stability over a wide range of temperatures, these materials can also display a high degree of flame retardancy relative to other thermoplastic materials. Polyethersulfones can retain these properties when exposed to solvents and chemicals, which can include oils and fuels used in the aerospace industry.

Polyethersulfones are defined as polymers that include a repeating ether group and sulfonyl group. In a technical context, polyethersulfones are sometimes also referred to as polyarylethersulfones, polyarylene sulfones, or simply polysulfones. Polyethersulfones may be prepared using the methods disclosed, for example, in U.S. Pat. No. 4,175,175 (Johnson et al.) and U.S. Pat. No. 3,647,751 (Darsow). Exemplary chemical structures for polyethersulfones can include, for example, structures (I), (II), and (III) depicted below, and combinations thereof:

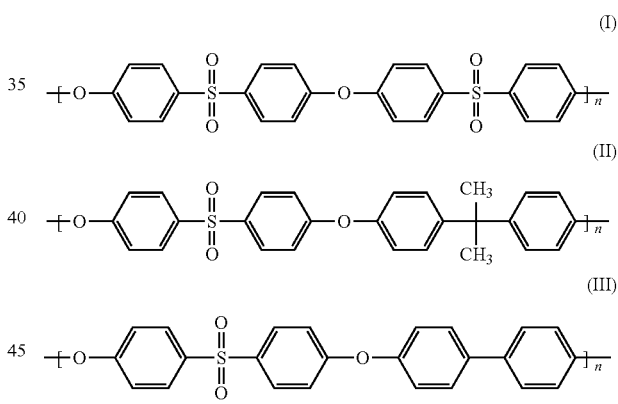

Polyethersulfones containing ether and alkylene groups in addition to sulfone groups can be predominately amorphous. In some embodiments, useful polyethersulfones can have glass transition temperatures $T_g$, of greater than 150° C., greater than 175° C., greater than 190° C., or in some embodiments, less than, equal to, or greater than, 150° C., 155, 160, 165, 170, 175, 180, 185, or 190° C. Useful polyethersulfones include resins provided under the trade designation ULTRASON by BASF SE, Ludwigshafen, Germany.

For use in an epoxy-based precursor in the adhesive composition, the polyethersulfone can include a chemical group that is reactive with an epoxide. In various embodiments, the reactive chemical group is an amine. Alternatively, the reactive chemical group can be a hydroxyl group. Exemplary compounds include amine-terminated polyethersulfones. In preferred embodiments, the amine-terminated polyethersulfones are diamines that are amine terminated on each end of the polyethersulfone.

The polyethersulfone can be any proportion of the curable composition. In some embodiments, the epoxy resin represents from 0.1 wt % to 20 wt %, 0.3 wt % to 10 wt %, or 0.5 wt % to 5 wt % of the curable composition, or in some embodiments, less than, equal to, or greater than 0.1 wt %, 0.2, 0.3, 0.4, 0.5, 0.7, 1, 2, 5, 7, 10, 12, 15, 17, or 20 wt % of the curable composition.

Polyepoxides

Polyepoxides resins are monomers, oligomers or prepolymers capable of reacting with a suitable curative to yield a hardened resin. These resins are useful as matrix resins fiber-reinforced composites and other structural applications because of their combination of thermal and chemical resistance, adhesion and abrasion resistance.

As used herein, polyepoxides represent organic compounds containing an average of more than one oxirane ring (or epoxide group) that is polymerizable by a ring opening mechanism. Diepoxides are polyepoxides that have on average approximately two oxirane rings. The epoxides can be monomeric or polymeric, and aliphatic, cycloaliphatic, heterocyclic, aromatic, or mixtures thereof. Polyepoxides can contain more than 1.1, more than 1.2, more than 1.3, more than 1.4, or more than 1.5 epoxide groups per molecule and preferably 2 or more epoxy groups per molecule.

Aromatic polyepoxides can be particularly useful based on their robustness at high temperatures. Aromatic polyepoxides are compounds in which there is present at least one aromatic ring structure, e.g. a benzene ring, and more than one epoxy group.

Useful aromatic polyepoxides can contain at least one aromatic ring (e.g., phenyl group) that is optionally substituted by a halogen, alkyl having 1 to 4 carbon atoms (e.g., methyl or ethyl), or hydroxyalkyl having 1 to 4 carbon atoms (e.g., hydroxymethyl). In some embodiments, the aromatic polyepoxide contains at least two or more aromatic rings and in some embodiments, can contain 1 to 4 aromatic rings. For polyepoxides and epoxy resin repeating units containing two or more aromatic rings, the rings may be connected, for example, by a branched or straight-chain alkylene group having 1 to 4 carbon atoms that may optionally be substituted by halogen (e.g., fluoro, chloro, bromo, iodo).

Useful aromatic polyepoxides also include polyglycidyl ethers of polyhydric phenols, glycidyl esters of aromatic carboxylic acid, N-glycidylaminobenzenes, and glycidy-lamino-glyclidyloxy-benzenes. The aromatic polyepoxides can be the polyglycidyl ethers of polyhydric phenols.

Examples of aromatic polyepoxides include the polyglycidyl derivatives of polyhydric phenols such as 2,2-bis[4-(2,3-epoxypropoxy)phenyl]propane and those described in U.S. Pat. No. 3,018,262 (Schroeder) and U.S. Pat. No. 3,298,998 (Coover et al.), and in "Handbook of Polyepoxide resins" by Lee and Neville, McGraw-Hill Book Co., New York (1967). A preferred class of polyglycidyl ethers of polyhydric phenols described above are diglycidyl ethers of bisphenol that have pendent carbocyclic groups. Examples of such diglycidyl ethers are 2,2-bis[4-(2,3-epoxypropoxy) phenyl]norcamphane and 2,2-bis[4-(2,3-epoxypropoxy)phenyl]decahydro-1,4,5,8-dimethanonaphthalene.

The provided curable compositions can include one or more diepoxide resins, which by definition have an average epoxide functionality of approximately two. Useful diepoxide resins include liquid resins derived from bisphenol A and epichlorohydrin. These resins are available under the trade designation EPON from Hexion, Inc., Columbus, Ohio and under the trade designation D.E.R. from Dow Chemical Co., Midland, Mich.

In a preferred embodiment, the curable composition includes a mixture of a cycloaliphatic polyepoxide resin and a liquid resin. Optionally, the liquid resin is a liquid diepoxide resin, but this component could also be a polyepoxide having a functionality greater than two. Cycloaliphatic polyepoxides can be advantageous because of their low moisture absorption. During storage of the uncured adhesive, the inclusion of cycloaliphatic polyepoxides in the composition can also prevent moisture uptake in high humidity environments. Both of these characteristics can help in providing good hot/wet bond performance in the cured adhesive. The liquid resin enables the curable composition to be tacky and have proper handling properties when incorporated into an adhesive film.

The cycloaliphatic polyepoxide resin can represent any suitable weight fraction of the provided curable composition, such as 5 wt % to 35 wt %, 7 wt % to 25 wt %, 10 wt % to 20 wt %, or in some embodiments less than, equal to, or greater than 5 wt %, 6, 7, 8, 9, 10, 12, 15, 17, 20, 22, 25, 27, 30, 32, or 35 wt %, relative to the overall weight of the curable composition.

The liquid diepoxide resin can represent any suitable weight fraction of the provided curable composition, such as 10 wt % to 60 wt %, 15 wt % to 50 wt %, 25 wt % to 40 wt %, or in some embodiments less than, equal to, or greater than 10 wt %, 12, 15, 17, 20, 22, 25, 27, 30, 35, 40, 45, 50, 55, or 60 wt %, relative to the overall weight of the curable composition.

The provided curable compositions can include one or more polyepoxides having a functionality greater than two. These crosslinkers enable the curable components to form a polymer network upon curing. In some embodiments, polyepoxides having a functionality greater than two can have an epoxide functionality of more than 2.1, more than 2.2, more than 2.3, more than 2.4, more than 2.5, more than 3, more than 3.5, more than 4, more than 5, more than 6, or more than 7.

Examples of suitable polyepoxides having a functionality greater than two include, for example, tetraglycidyl methylene dianiline (TGMDA), tris(4-hydroxyphenyl)methane triglycidyl ether, and novolac solid epoxy resins. Novolac epoxy resins may be based on a phenol novolac, an ortho-, meta-, or para-cresol novolac, or a combination thereof, and can have epoxide functionalities of 8 or more.

The amount of polyepoxide having a functionality greater than two used can be adjusted to any proportion of the curable composition to obtain an appropriate degree of crosslinking when the provided curable composition is fully cured. In some embodiments, the polyepoxide having a functionality greater than two represents from 10 wt % to 70 wt %, 20 wt % to 60 wt %, or 30 wt % to 50 wt % of the curable composition, or in some embodiments, less than, equal to, or greater than 10 wt %, 15, 20, 25, 30, 35, 40, 45, 50, 55, 60, 65, or 70 wt % of the curable composition.

Collectively, the epoxide resins (including crosslinkers) can be any proportion of the curable composition appropriate to obtain the desired physical properties after curing. In some embodiments, the epoxy resin represents from 30 wt % to 60 wt %, 40 wt % to 55 wt %, or 45 wt % to 50 wt % of the curable composition, or in some embodiments, less than, equal to, or greater than 30 wt %, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt % of the curable composition.

Curatives

The provided curable adhesive compositions include one or more curatives. In some embodiments, the provided curatives can afford a composition that is thermally curable. Thermally-curable compositions do not cure at ambient temperature but at elevated temperatures. Advantageously, the provided curatives can be used to prepare a resin having both high ductility and a high glass transition temperature.

In useful embodiments, the primary curative in the curable composition comprises a 9,9-bis(aminophenyl)fluorene or derivative therefrom. The phenyl and benzo groups of the 9,9-bis(aminophenyl)fluorene or derivative therefrom can be unsubstituted or substituted by one or more atoms or groups inert to reaction with an epoxide group. 9,9-bis (aminophenyl)fluorene is a crystalline solid that has a melting temperature of about 240° C. This curative is insoluble in the epoxide components of the curable composition at ambient temperatures, but become reactive upon melting to provide a thermal curing mechanism.

In some embodiments, the curative has the chemical structure (IV) below:

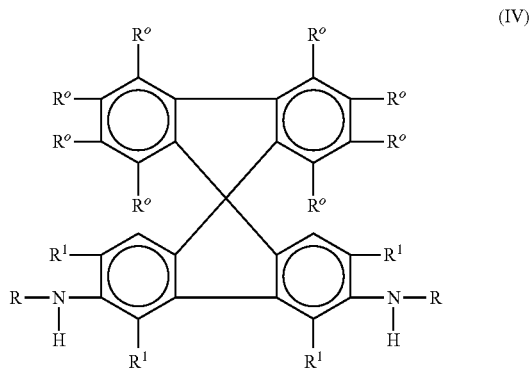

wherein each $R^o$ is independently selected from hydrogen and groups that are inert in the polymerization of epoxide group-containing compounds, preferably selected from halogen, linear and branched alkyl groups having 1 to 6 carbon atoms, phenyl, nitro, acetyl and trimethylsilyl; each R is independently selected from hydrogen and linear and branched alkyl groups having 1 to 6 carbon atoms; and each R1 is independently selected from R, hydrogen, phenyl, and halogen.

In some embodiments, the curable composition can include a 9,9-bis(aminophenyl) fluorene or derivative therefrom having the structure (IV) above, wherein each $R^o$ is independently selected from hydrogen and groups inert in the polymerization of epoxide group-containing compounds, optionally selected from halogen, linear and branched alkyl groups having 1 to 6 carbon atoms, phenyl, nitro, acetyl and trimethylsilyl, each R is independently selected from hydrogen and linear and branched alkyl groups having 1 to 6 carbon atoms of which at least 25 mole percent of R is linear or branched alkyl, and each R1 is independently selected from hydrogen, linear and branched alkyl groups having one to six carbon atoms, phenyl, or halogen groups.

The stoichiometric ratio of curative to aromatic polyepoxide can be adjusted as needed to control the crosslink density of the cured epoxy composition. Resins having reduced crosslink density are desirable because they are exceptionally ductile and can be rubber toughened by the addition of core shell particles as described herein. Further details concerning fluorene curatives are described in U.S. Pat. No. 4,684,678 (Schultz et al.).

Examples of 9,9-bis(aminophenyl)fluorene derivatives include: 9,9-bis(4-aminophenyl)fluorene, 4-methyl-9,9-bis (4-aminophenyl)fluorene, 4-chloro-9,9-bis(4-aminophenyl) fluorene, 2-ethyl-9,9-bis(4-aminophenyl)fluorene, 2-iodo-9, 9-bis(4-aminophenyl)fluorene, 3-bromo-9,9-bis(4-aminophenyl)fluorene, 9-(4-methylaminophenyl)-9-(4-ethylaminophenyl)fluorene, 1-chloro-9,9-bis(4-aminophenyl)fluorene, 2-methyl-9,9-bis(4-aminophenyl) fluorene, 2,6-dimethyl-9,9-bis(4-aminophenyl)fluorene, 1,5-dimethyl-9,9-bis(4-aminophenyl)fluorene, 2-fluoro-9,9-bis (4-aminophenyl)fluorene, 1,2,3,4,5,6,7,8-octafluoro-9,9-bis (4-aminophenyl)fluorene, 2,7-dinitro-9,9-bis(4-aminophenyl)fluorene, 2-chloro-4-methyl-9,9-bis(4-aminophenyl)fluorene, 2,7-dichloro-9,9-bis(4-aminophenyl) fluorene, 2-acetyl-9,9-bis(4-aminophenyl)fluorene, 2-methyl-9,9-bis(4-methylaminophenyl)fluorene, 2-chloro-9,9-bis(4-ethylaminophenyl)fluorene, 2-t-butyl-9,9-bis(4-methylaminophenyl)fluorene, 9,9-bis(3-methyl-4-aminophenyl)fluorene, and 9-(3-methyl-4-aminophenyl)-9-(3-chloro-4-aminophenyl)fluorene.

Useful curatives also include bis(secondary-aminophenyl)fluorenes or a mixture of the bis(secondary-aminophenyl)fluorenes and a (primary-aminophenyl)(secondary-aminophenyl)fluorene.

In some embodiments, the primary curative includes a sterically hindered bis(primary-aminophenyl) fluorene. When hindered amines or mixtures of such hindered amines with the secondary amines above are used as the curative in the provided curable compositions, such compositions can have a thermal stability (or latency) of at least 2-3 weeks at ambient temperature and provide cured compositions that have a high glass transition temperature and a water pick-up of less than about 5 percent by weight.

Examples of hindered amines include 9,9-bis(3-methyl-4-aminophenyl)fluorene, 9,9-bis(3-ethyl-4-aminophenyl) fluorene, 9,9-bis(3-phenyl-4-aminophenyl)fluorene, 9,9-bis (3,5-dimethyl-4-methylaminophenyl)fluorene, 9,9-bis(3,5-dimethyl-4-aminophenyl)fluorene, 9-(3,5-dimethyl-4-methylaminophenyl)-9-(3,5-dimethyl-4-aminophenyl) fluorene, 9-(3,5-diethyl-4-aminophenyl)-9-(3-methyl-4-aminophenyl)fluorene, 1,5-dimethyl-9,9-bis(3,5-dimethyl-4-methylaminophenyl)fluorene, 9,9-bis(3,5-diisopropyl-4-aminophenyl)fluorene, 9,9-bis(3-chloro-4-aminophenyl) fluorene, 9,9-bis(3,5-dichloro-4-aminophenyl)fluorene, 9,9-bis(3,5-diethyl-4-methylaminophenyl)fluorene, 9,9-bis(3,5-diethyl-4-aminophenyl)fluorene.

The 9,9-bis(aminophenyl)fluorene or derivative therefrom can form any suitable proportion of the provided curable composition relative to the number of epoxide groups present in the curable composition. For example, the 9,9-bis(aminophenyl)fluorene or derivative therefrom can provide from 1 to 2 amino groups, 1.1 to 1.8 amino groups, or 1.2 to 1.6 amino groups per epoxide group in the curable composition. In some embodiments, the 9,9-bis(aminophenyl)fluorene or derivative therefrom can provide less than, equal to, or greater than 0.5, 0.6, 0.7, 0.8, 0.9, 1, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95 or 2.0 amino groups per epoxide group in the curable composition.

The 9,9-bis(aminophenyl)fluorene or derivative therefrom can form any suitable weight fraction of the provided curable composition, such as 0.5 wt % to 60 wt %; 2 wt % to 50 wt %; 5 wt % to 40 wt %; or in some embodiments less than, equal to, or greater than 0.5 wt %, 0.7, 1, 1.2, 1.5, 1.7, 2, 2.5, 3, 3.5, 4, 4.5, 5, 6, 7, 8, 9, 10, 12, 15, 17, 20, 25, 30, 35, 40, 45, 50, 55, or 60 wt %, relative to the overall weight of the curable composition.

As a primary curative that transforms the curable composition to a functionally cured state—e.g., where it can adequately serve as a structural adhesive—the 9,9-bis(aminophenyl) fluorene or derivative therefrom generally displays a curing onset temperature of from 150° C. to 200° C. In some embodiments, the curing onset temperature can be less than, equal to, or greater than 150° C., 155, 160, 165, 170, 175, 180, 185, 190, 195, or 200° C.

In some embodiments, the curable adhesive composition further contains a secondary curative. The secondary curative can provide a limited degree of crosslinking sufficient to retard flow of the adhesive composition as the composition is in the process of being thermally cured.

A useful secondary curative is dicyandiamide, sometimes referred to as cyanoguanidine. Dicyandiamide is a known latent curative for thermally cured epoxy resins (H. Lee and K. Neville "Epoxy Resins" McGraw Hill, New York, 1957, p 110). Advantageously, dicyandiamide is insoluble in the epoxy resin at ambient temperatures. Its curative properties become apparent when this component either dissociates or dissolves in the resin.

Dicyandiamide can represent any suitable weight fraction of the provided curable composition, such as 0.01 wt % to 5 wt %; 0.1 wt % to 3 wt %; 0.2 wt % to 1.5 wt %; or in some embodiments less than, equal to, or greater than 0.01 wt %, 0.05, 0.1, 0.2, 0.5, 0.7, 1, 1.5, 2, 2.5, 3, 3.5, 4, 4.5, 5, 6, 7, 8, 9, or 10 wt %, relative to the overall weight of the curable composition.

The provided curable compositions may further include an imidazole. The imidazole can act as a curative on its own (i.e., as a tertiary curative), or as an accelerator that acts in combination with the dicyandiamide (i.e., as part of the secondary curative). In the latter case, the addition of an imidazole can lower the activation energy of the dicyandiamide while preserving the desirable physical properties of the adhesive composition when cured. Advantageously, imidazoles can be well suited to provide cured compositions having a very high glass transition temperature. Imidazoles generally have the structure (V) below:

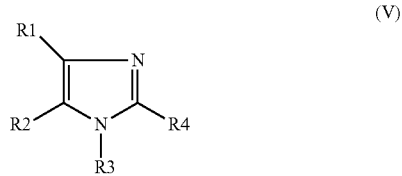

(V)

wherein R1, R2, R3 and R4 are independently selected from H, $C_nH_{(2n+1)}$, phenyl, hydroxy methyl, or ethyl triazine, and n=1 to 17. Examples of useful imidazoles include imidazole, 2-ethylimidazole, 2-ethyl, 4-methylimidazole, 2-phenylimidazole, along with mixtures thereof.

The imidazole can represent any suitable weight fraction of the provided curable composition, such as 0.01 wt % to 2 wt %; 0.05 wt % to 1.5 wt %; 0.1 wt % to 1 wt %; or in some embodiments less than, equal to, or greater than 0.01 wt %, 0.05, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.5, 3, 3.5, 4, 4.5, or 5 wt %, relative to the overall weight of the curable composition.

The secondary curative has a curing onset temperature that is lower than that of the primary curative. In some embodiments, the secondary curative has a curing onset temperature of from 60° C. to 180° C., from 80° C. to 150° C., from 100° C. to 130° C., or in some embodiments, less than, equal to, or greater than 60° C., 65, 70, 75, 80, 85, 90, 95, 100, 105, 110, 115, 120, 125, or 130° C.

In some embodiments, the difference between the curing onset temperature of the primary curative and the secondary curative is sufficiently large that the exotherms associated with their respective curing reactions are distinctly identifiable, using for example differential scanning calorimetry. The difference between the curing onset temperature of the primary curative and that of the secondary curative can be from 10° C. to 100° C., from 20° C. to 100° C., from 30° C. to 60° C., or in some embodiments, less than, equal to, or greater than 10° C., 15, 20, 25, 30, 35, 40, 45, 50, 55, 60, 65, 70 75, 80, 85, 90, 95, or 100° C.

Core Shell Particles

The provided curable compositions further contain a plurality of core shell particles dispersed therein. Core shell particles are filler particles having two or more distinct concentric parts—a core and one or more shell layers surrounding the core. In some embodiments, the core is an elastomeric core and made from either a physically cross-linked or microphase-separated polymer, while the shell layer is made from a glassy polymer that is not an elastomer. The elastomeric core enhances toughness of the cured composition, while the glassy polymeric shell imparts improved compatibility between the filler particle and the matrix component of the curable composition. Because the core shell particles are heterogenous with the epoxy matrix in which it is dispersed, the glass transition temperature and other properties of the matrix are relatively unaffected.

The core shell particles can have any suitable average particle diameter for the application at hand, including but not limited to toughening structural adhesive films. In exemplary composite applications, the core shell particles can have a particle diameter in the range of from 10 nm to 800 nm, from 50 nm to 500 nm, or from 80 nm to 300 nm, or in some embodiments, less than, equal to, or greater than 5 nm, 10, 20, 30, 40, 50, 70, 100, 200, 300, 400, 500, 600, 700, 800, 900, or 1000 nm.

The core shell particles may be uniformly dispersed in the composition, or at least partially aggregated. Aggregated core shell particles may be in physical contact with one or more other core shell particles. In some embodiments, the core shell particles form long chains of aggregated particles that extend across the bulk of the curable composition. Such aggregated core shell particle chains may be linear or branched. The core shell particle chains may themselves be uniformly distributed throughout the bulk of the curable composition. The configuration of such aggregates can be substantially preserved when the curable composition is cured.

The particle diameter distribution of the core shell particles can be monomodal or multimodal. A monomodal particle diameter distribution is characterized by a single peak (or mode) in particle diameter distribution, while a multimodal distribution is characterized by two or more peaks in particle diameter distribution. A multimodal distribution can be a bimodal distribution characterized by exactly two peaks, a trimodal distribution with exactly three peaks, and so forth.

In embodiments that use a multimodal distribution of core shell particles, the distribution can include a first mode (as determined by transmission electron microscopy) characterized by a particle size "D1" in the range of from 120 nm to 500 nm, 160 nm to 425 nm, or 200 nm to 350 nm. In some embodiments, the particle size of the first mode is less than, equal to, or greater than 100 nm, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or 500 nm.

A multimodal distribution of the core shell particles can display a second mode characterized by a particle diameter "D2" that is less than that of the first mode. In some embodiments, D2 is in the range of from 30 nm to 200 nm, 40 nm to 150 nm, or 50 nm to 100 nm. In some embodiments, the particle size of the first mode is less than, equal to, or greater than, 30 nm, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 nm.

Assuming that the particle diameter of the first mode D1 is greater than the particle diameter of the second mode, D2, the ratio D1:D2 can be at least 1.5:1, at least 2:1, at least 4:1, or at least 10:1. Generally, the ratio of D1:D2 is no greater than 10:1. In some embodiments, the ratio D1:D2 can be less than, equal to, or greater than 1.5:1, 2:1, 3:1, 4:1, 5:1, 6:1, 7:1, 8:1, 9:1, or 10:1.

In some embodiments, the elastomeric core is comprised of a polymer having a low glass transition temperature enabling rubbery behavior, such as less than 0° C., or less than 30° C. More broadly, the glass transition temperature of the core polymer can be in the range of −100° C. to 25° C., −85° C. to 0° C., or −70° C. to −30° C., or in some embodiments, less than, equal to, or greater than −100° C., −95, −90, −85, −80, −75, −70, −65, −60, −55, −50, 45, −40, −35, −30, −25, −20, −15, −10, −5, 0, 5, 10, 15, 20, or 25° C.

Suitable core polymers broadly include various rubbers and polymers and copolymers of conjugated dienes, acrylates, and methacrylates. Such polymers can include, for example, homopolymers of butadiene or isoprene, or any of a number of copolymers of butadiene or isoprene with one or more ethylenically unsaturated monomers, which may include vinyl aromatic monomers, acrylonitrile, methacrylonitrile, acrylates, and methacrylates. Alternatively, or in combination with the above, the core polymer could include a polysiloxane rubber-based elastomer.

The shell polymer need not be particularly restricted and can be comprised of any suitable polymer, including thermoplastic and thermoset polymers. Optionally, the shell polymer is crosslinked. In some embodiments, the shell polymer has a glass transition temperature greater than ambient temperature, i.e., greater than 25° C. The glass transition temperature of the shell polymer can be in the range of 30° C. to 170° C., 55° C. to 150° C., or 80° C. to 130° C.; or in some embodiments, less than, equal to, or greater than 30° C., 35, 40, 45, 50, 55, 60, 65, 70, 75, 80, 85, 90, 95, 100, 105, 110, 115, 120, 125, 130, 135, 140, 145, 150, 155, 160, 165, or 170° C.

Suitable shell polymers include polymers and copolymers of dienes, acrylates, methacrylates, vinyl monomers, vinyl cyanides, unsaturated acids and anhydrides, acrylamides, and methacrylamides. Specific examples of suitable shell polymers include, poly(methylmethacrylate), polystyrene, polyacrylonitrile, polyacrylic acid, and methylmethacrylate butadiene styrene copolymer.

Additional options and advantages of core shell particles are described, for example, in International Application No. PCT/US2017/067491 (Hackett, et al.).

Dispersing core shell particles into a curable composition, and particularly a curable composition based on an epoxy resin, can improve the toughness of the cured composition in different ways. As an example, the core polymer can be engineered to cavitate on impact, which dissipates energy. Core shell particles can also intercept and impede the propagation of cracks and relieve stresses that are generated during the curing of the matrix resin material.

The core shell particles can be any proportion of the curable composition suitable to obtain the desired impact resistance after the composition is cured. In some embodiments, the core shell particles represent from 1 wt % to 25 wt %, 2 wt % to 20 wt %, or 5 wt % to 15 wt % of the curable composition, or in some embodiments, less than, equal to, or greater than 1 wt %, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt % of the curable composition.

Core shell particles can be made using any known method, including graft polymerization or seed emulsion polymerization methods. An exemplary process for making core shell particles is described, for example, in U.S. Patent Publication No. 2009/0298969 (Attarwala et al.).

Suitable core shell particles having properties described therein are commercially available dispersions in an epoxy resin matrix, such as available from Kaneka North America LLC, Pasadena, Tex. Useful dispersions include, for example, Kaneka MX-120 (masterbatch of 25 wt % microsized core-shell rubber in a diglycidyl ether of bisphenol A matrix).

In preparing the curable composition, masterbatches of core shell particles can be conveniently diluted with epoxy resin as appropriate to obtain the desired loading. This mixture can then be mechanically mixed, optionally with any remaining component or components of the curable composition.

Other Additives

The provided compositions may also contain known fillers such as the various ground or precipitated chalks, quartz powder, alumina, metallic aluminum powder, aluminum oxide, zinc oxide, calcium oxide, silver flakes, dolomite, graphite, granite, carbon fibers, glass fibers, textile fibers, polymeric fibers, titanium dioxide, fused silica, nano and hydrophobic grade silica (e.g., TS720), sand, carbon black, calcium oxide, calcium magnesium carbonates, barite and, especially, silicate-like fillers of the aluminum magnesium calcium silicate type, for example wollastonite and chlorite. the compositions may contain from about 0.5 to about 40 weight percent of fillers.

In some embodiments, the composition additionally contains one or more platy fillers such as mica, talc or clay (e.g., kaolin). The adhesive compositions according to the present invention may also contain other common adjuvants and additives, such as plasticizers, reactive and/or non-reactive diluents, flow auxiliaries, coupling agents (e.g., silanes), adhesion promoters, wetting agents, tackifiers, flame retardants, thixotropic and/or rheology control agents (e.g., fumed silica, mixed mineral thixotropes), aging and/or corrosion inhibitors, stabilizers and/or coloring pigments. Depending on the requirements of the adhesive application, relative proportions of the individual components may vary considerably within wide limits.

Depending on the application, the curable composition may contain inorganic fillers that are of relatively high density, such as aluminum powder. In some embodiments, the aluminum powder is spherical. Inclusion of such metallic fillers can advantageously dissipate heat, reactively scavenge oxygen gas, and avoid thereby slow the rate of adhesive degradation.

In some embodiments, the components of the curable composition include an inorganic filler having a density of at least 2 $g/cm^2$, at least 3 $g/cm^2$, or at least 4 $g/cm^2$. Such fillers may be present in an amount of from 0% to 50% by weight, 1% to 30% by weight, or 5% to 20% by weight, or in some embodiments, less than, equal to, or greater than 0%, 1, 2, 3, 4, 5, 7, 10, 15, 20, 25, 30, 35, 40, 45, or 50% by weight, in each case relative to the overall weight of the curable composition.

Applications

The provided compositions disclosed herein can be used to make adhesive films suitable for bonding to a substrate selected from composite, metal, or honeycomb structures, or for bonding two such substrates to each other. The provided compositions can also be used as matrix resins for fiber-reinforced prepregs. These products have a wide range of potential industrial and commercial uses, and are not limited to aerospace applications. For example, structural adhesive films based on the provided curable compositions may be used in primary structures of passenger vehicles, commercial vehicles, and wind mills.

Optionally, some or all of the epoxide components of the curable composition can be prereacted with the polyethersulfone to form a reactive precursor to cap any epoxide-reactive groups present on the polyethersulfone with the epoxide components. This can be accomplished by heating and mixing the epoxide resin components to a temperature sufficient obtain a homogeneous liquid and then adding the polyethersulfone. The polyethersulfone, which is typically amine-terminated or hydroxyl-terminated, can be mixed with a large excess (e.g., a 200%-3000% stoichiometric excess) of epoxide components to obtain the reactive precursor. In some embodiments, the reacting step is performed at 250-300° F. for a period of 2-3 hours.

If desired, the reactive precursor can then be mixed with an additional mix of epoxide components, as appropriate, to achieve the desired epoxide formulation in the adhesive film and physical properties in the final cured product. Core shell particles, fumed silica, and other inert additives such as high-density filler, can also be added at this stage. It can be advantageous to add these fillers prior to the addition of curative components, since the compounding of these fillers can generate heat and inadvertently induce curing.

The mixture can be cooled and maintained at a lower temperature for the addition of the curative components, the temperature being sufficiently low to avoid premature curing of the curable composition. To avoid premature curing, the mix temperature is kept well below the curing onset temperature for any primary or secondary curatives present in the curable composition. The mix temperature at which the curative components are added can be from 50° C. to 150° C., from 60° C. to 130° C., from 70° C. to 110° C., or in some embodiments, less than, equal to, or greater than 50° C., 55, 60, 65, 70, 75, 80, 85, 90, 95, 100, 105, 110, 115, 120, 125, 130, 135, 140, 145, or 150° C.

The curable composition above can be hot melt processed by coating the above melt onto a release surface at a temperature and weight sufficient to form a film. In one embodiment, the coating step can be performed in a temperature range of from 38° C. to 93° C. (100° F. to 200° F.) and coated to a basis weight of from 0.01 g/cm$^2$ to 0.07 g/cm$^2$ (0.02-0.15 psf).

Adhesive films can be made according to other known methods. Another suitable method includes, for example, solvent casting. In a solvent casting method, the pre-reaction components can be dispersed in a common solvent and the solvent later evaporated to obtain the adhesive film. As above, care should be taken to avoid temperatures that may lead to premature curing of the composition based on the particular curative components selected.

While not required, adhesive films of the curable composition can further include a carrier such as a woven or knit mat, or a random mat, derived from glass, polyester, nylon, or other suitable polymeric materials. Such carriers are useful for controlling bondline thickness. The provided compositions can also be coated as unsupported films. The unsupported films are generally designed for reticulation onto the honeycomb or a perforated metal or composite sheet used in the acoustic applications for aircraft nacelles.

The provided compositions are suitable for adhesion to substrates made of both metallic and non-metallic materials. Such materials include, but are not limited to, wood, metal, coated or pretreated metal, plastic, filled plastic, thermoset materials such as sheet molding compound and fiberglass and the like, and honeycomb structures. The substrates to be joined using the adhesive may be similar or dissimilar from each other. Honeycomb structures include those made from metals such as titanium or aluminum, or non-metals such as polyamide, gloss-phenolic, and polyimide.

The provided compositions can be adhered to a substrate surface by any known technique. Generally, the adhesive is applied to one or both substrates to be joined, and the substrates brought together such that the adhesive is disposed between the substrates. Thereafter, the adhesive composition is subjected to pressure and heating to a temperature and for a time at which the heat curable or latent curing agent initiates cure of the epoxy resin-containing composition.

The provided curable compositions can be cured by heating to a temperature from 163° C. to 204° C. (325° F. to 400° F.) at pressures ranging from 25-100 psi (0.17-0.69 MPa). To achieve a full cure, the composition can be maintained at this temperature and pressure for a sufficient period of time, typically from 1 to 2 hours.

Advantageously, curing of the provided compositions can take place in two successive phases, corresponding to the primary and secondary curatives being triggered at different temperatures as the curable composition is heated. As temperature is progressively increasing, the first and second phases of curing each occur over a range of temperatures, and such ranges may overlap with each other.

In the first phase, a small quantity of secondary curative is activated at a temperature above the curing onset temperature of the secondary curative. This results in the partial curing of the curable composition at intermediate temperatures, characterized by light crosslinking and an increase in viscosity. These physical changes significantly reduce or prevent sagging of the adhesive during the curing cycle. In the second phase, the composition is heated to even higher temperatures exceeding the curing onset temperature of the primary curative. The primary curative activates at the higher temperatures and ultimately results in the composition being fully cured.

Using a combination of primary and secondary curatives as described herein provides advantages of high ductility, high glass transition temperature, and low degree of moisture uptake provided by 9,9-bis(aminophenyl)fluorene-based curatives, while avoiding the problem of sagging normally encountered with high temperatures required to activate such curatives. The provided adhesive films resists sagging when adhered to a vertical substrate and heated to a temperature of from 50° C. to 250° C., 120° C. to 250° C., 120° C. to 200° C., or in some embodiments, less than, equal to, or greater than 50° C., 60, 70, 80, 90, 100, 110, 120, 130, 140, 150, 160, 170, 180, 190, 200, 210, 220, 230, 240, or 250° C.

Not intended to be limiting, further exemplary embodiments are provided as follows.

1. A curable composition comprising a reactive mixture of components comprising: a polyethersulfone having a chemical group reactive with an epoxide; a cycloaliphatic polyepoxide resin; a polyepoxide having a functionality greater than two; a liquid diepoxide resin; and a first curative having a curing onset temperature of from 150° C. to 200° C. and comprising 9,9-bis(aminophenyl)fluorene or derivative therefrom.

2. The curable composition of embodiment 1, wherein the polyethersulfone comprises an amine-terminated polyethersulfone.

3. The curable composition of embodiment 1 or 2, wherein the polyethersulfone is present in an amount of from 0.1% to 20% by weight, based on the overall weight of the curable composition.

4. The curable composition of embodiment 3, wherein the polyethersulfone is present in an amount of from 0.3% to 10% by weight, based on the overall weight of the curable composition.

5. The curable composition of embodiment 3, wherein the polyethersulfone is present in an amount of from 0.5% to 5% by weight, based on the overall weight of the curable composition.

6. The curable composition of any one of embodiments 1-5, wherein the cycloaliphatic polyepoxide is present in an amount of from 5% to 35% by weight, based on the overall weight of the curable composition.

7. The curable composition of embodiment 6, wherein the cycloaliphatic polyepoxide is present in an amount of from 7% to 25% by weight, based on the overall weight of the curable composition.

8. The curable composition of embodiment 7, wherein the cycloaliphatic polyepoxide is present in an amount of from 10% to 20% by weight, based on the overall weight of the curable composition.

9. The curable composition of any one of embodiments 1-8, wherein the cycloaliphatic polyepoxide is present in an amount of from 10% to 60% by weight, based on the overall weight of the curable composition.

10. The curable composition of embodiment 9, wherein the cycloaliphatic polyepoxide is present in an amount of from 15% to 50% by weight, based on the overall weight of the curable composition.

11. The curable composition of embodiment 10, wherein the cycloaliphatic polyepoxide is present in an amount of from 25% to 40% by weight, based on the overall weight of the curable composition.

12. The curable composition of any one of embodiments 1-11, wherein the 9,9-bis(aminophenyl)fluorene or derivative therefrom comprises 9,9-bis(3-methyl-4-aminophenyl)fluorene, 9,9-bis(3-chloro-4-aminophenyl)fluorene, or a mixture thereof.

13. The curable composition of any one of embodiments 1-12, wherein the 9,9-bis(aminophenyl)fluorene or derivative therefrom is present in an amount of from 0.5% to 60% by weight, based on the overall weight of the curable composition.

14. The curable composition of embodiment 13, wherein the 9,9-bis(aminophenyl)fluorene or derivative therefrom is present in an amount of from 2% to 50% by weight, based on the overall weight of the curable composition.

15. The curable composition of embodiment 14, wherein the 9,9-bis(aminophenyl)fluorene or derivative therefrom is present in an amount of from 5% to 40% by weight, based on the overall weight of the curable composition.

16. The curable composition of any one of embodiments 1-15, wherein the components further comprise a second curative having a curing onset temperature of from 60° C. to 180° C.

17. The curable composition of embodiment 16, wherein the second curative has a curing onset temperature of from 80° C. to 150° C.

18. The curable composition of embodiment 17, wherein the second curative has a curing onset temperature of from 100° C. to 130° C.

19. The curable composition of any one of embodiments 16-18, wherein the second curative comprises dicyandiamide.

20. The curable composition of embodiment 19, wherein the dicyandiamide is present in an amount of from 0.01% to 5% by weight, based on the overall weight of the curable composition.

21. The curable composition of embodiment 20, wherein the dicyandiamide is present in an amount of from 0.1% to 3% by weight, based on the overall weight of the curable composition.

22. The curable composition of embodiment 21, wherein the dicyandiamide is present in an amount of from 0.2% to 1.5% by weight, based on the overall weight of the curable composition.

23. The curable composition of any one of embodiments 16-22, wherein the second curative further comprises an imidazole.

24. The curable composition of embodiment 23, wherein the imidazole is present in an amount of from 0.01% to 2% by weight, based on the overall weight of the curable composition.

25. The curable composition of embodiment 24, wherein the imidazole is present in an amount of from 0.05% to 2% by weight, based on the overall weight of the curable composition.

26. The curable composition of embodiment 25, wherein the imidazole is present in an amount of from 0.1% to 1% by weight, based on the overall weight of the curable composition.

27. The curable composition of any one of embodiments 1-26, wherein the components further comprise a plurality of core shell particles, each core shell particle comprising an elastomeric core and a polymeric outer shell layer disposed on the elastomeric core.

28. The curable composition of embodiment 27, wherein the core shell particles are present in an amount of from 1% to 35% by weight, based on the overall weight of the curable composition.

29. The curable composition of embodiment 28, wherein the core shell particles are present in an amount of from 2% to 20% by weight, based on the overall weight of the curable composition.

30. The curable composition of embodiment 29, wherein the core shell particles are present in an amount of from 5% to 15% by weight, based on the overall weight of the curable composition.

31. The curable composition of any one of embodiments 1-30, wherein the components further comprise an inorganic filler having a density of at least 2 g/cm2.

32. The curable composition of embodiment 31, wherein the inorganic filler comprises aluminum powder.

33. The curable composition of embodiment 31 or 32, wherein the inorganic filler is present in an amount of from 0% to 50% by weight based on the overall weight of the curable composition.

34. The curable composition of embodiment 33, wherein the inorganic filler is present in an amount of from 1% to 30% by weight based on the overall weight of the curable composition.

35. The curable composition of embodiment 34, wherein the inorganic filler is present in an amount of from 5% to 20% by weight based on the overall weight of the curable composition.

36. An adhesive film comprising the curable composition of any one of embodiments 1-35.

37. The adhesive film of embodiment 36, wherein at least some of the components of the curable composition are coated from a hot melt to obtain the adhesive film.

38. The adhesive film of embodiment 37, wherein at least some components of the curable composition are solvent cast to obtain the adhesive film.

39. The adhesive film of any one of embodiments 36-38, wherein the components further comprise a second curative having a curing onset temperature of from 60° C. to 180° C. and wherein the adhesive film resists sagging when adhered to a vertical substrate and heated to a temperature of from 50° C. to 250° C.

40. An adhesive film comprising: a first curative having a curing onset temperature of from 150° C. to 200° C.; and a second curative having a curing onset temperature of from 60° C. to 180° C., wherein the adhesive film resists sagging when adhered to a vertical substrate and heated to a temperature of from 50° C. to 250° C.

41. The adhesive film of embodiment 39 or 40, wherein the adhesive film resists sagging when adhered to a vertical substrate and heated to a temperature of from 120° C. to 250° C.

42. The adhesive film of embodiment 41, wherein the adhesive film resists sagging when adhered to a vertical substrate and heated to a temperature of from 120° C. to 200° C.

43. Use of the adhesive film of any one of embodiments 36-42 for bonding to an aircraft structure.

44. Use of the adhesive film of embodiment 43, wherein the aircraft structure comprises a honeycomb composite.

45. A method of bonding the adhesive film of any one of embodiments 36-44 to a substrate, the method comprising: applying the adhesive film to the substrate; heating the adhesive film to a temperature above an curing onset temperature of the second curative to partially cure the adhesive film; and further heating the adhesive film to a temperature above an curing onset temperature of the first curative to fully cure the adhesive film.

46. The method of embodiment 45, wherein the substrate comprises a vertical substrate.

47. The method of embodiment 45 or 46, wherein the substrate is a first substrate and further comprising applying the adhesive film to a second substrate prior to the adhesive film being fully cured.

48. The method of embodiment 47, wherein the first substrate and/or second substrate comprises a honeycomb composite.

49. A method of bonding a honeycomb structure to a skin, the method comprising: providing an adhesive film comprising a first curative having a curing onset temperature of from 150° C. to 200° C. and a second curative having a curing onset temperature of from 60° C. to 180° C.; applying the adhesive film to at least one of the honeycomb structure and the skin; heating the adhesive film to a temperature above the curing onset temperature of the second curative to partially cure the adhesive film; and further heating the adhesive film to a temperature above the curing onset temperature of the first curative to fully cure the adhesive film, wherein the adhesive film resists sagging when adhered to a vertical or out of plane substrate and heated to a temperature of from 50° C. to 250° C.

Examples

Objects and advantages of this disclosure are further illustrated by the following non-limiting examples, but the particular materials and amounts thereof recited in these examples, as well as other conditions and details, should not be construed to unduly limit this disclosure.

Unless otherwise noted, all parts, percentages, ratios, etc. in the Examples and the rest of the specification are by weight.

TABLE 1

| Materials | | |
|---|---|---|
| Designation | Description | Source |
| ATPES | amine terminated polyether sulfone, available under the trade designation "VW-30500 RP" | Solvay. Brussels, Belgium |
| CAF | 9,9-bis(3-chloro-4-aminophenyl)fluorine | 3M Co., St. Paul, MN |
| EPON 828 | A bisphenol-A liquid epoxy resin having an epoxy equivalent weight of 185-192 grams/equivalent, available under the trade designation "EPON 828" | Hexion Specialty Chemicals, Louisville, KY |
| MY-9655 | Multifunctional tetraglycidyl methylenedianiline (TGMDA), obtained under the trade designation "ARALDITE MY-9655" | Huntsman Advanced Chemicals, Woodlands, TX |
| MX-257 | A diglycidyl ether of bisphenol-A epoxy resin containing 37.5 wt. % butadiene-acrylic co-polymer core shell rubber having an approximate epoxy equivalent weight of 294 grams/equivalent, obtained under the trade designation "KANE ACE MX-257" | Kaneka Texas Corporation, Pasadena, TX |
| DER 332 | A bisphenol-A liquid epoxy resin having an epoxy equivalent weight of 172-176 grams/equivalent | Dow Chemical Co., Midland, MI |
| R816 | A treated fumed silica, available under the trade designation "AEROSIL R816" | Evonik Corp., Essen, Germany |
| SU 8 | A solid epoxy having an average functionality of about 8 | Hexion Specialty Chemicals, Louisville, KY |
| TACTIX 756 | A dicyclopentadienyl-based epoxy resin | Hexion Specialty Chemicals, Louisville, KY |

TABLE 1-continued

Materials

| Designation | Description | Source |
|---|---|---|
| EXL-2691 | A general-purpose methacrylate-butadiene-styrene (MBS) core-shell impact modifier, available under the trade designation "PARALOID EXL-2691" | Huntsman Advanced Chemicals, Woodlands, TX |
| DICY | A micronized dicyandiamide, having an approximate amine equivalent weight of 21 grams/equivalent, available under the trade designation "ANCAMINE CG-1400" | Air Products and Chemicals Incorporated, Allentown, PA |
| 2MAOK | An imidazole, accelerator for dicyandiamide, anhydride and phenolic curing agents, available under the trade designation "CUREZOL 2MAOK" | Air Products, Allentown, PA |
| OTBAF | 9,9-bis(3-methyl-4-aminophenyl)fluorine | 3M Co., St. Paul, MN |

Typical procedure to make exemplary film adhesives:

Step 1—Pre-Reaction of ATPES and Epoxy Resins:

EPON 828, MY-9655, TACTIX 756, SU 8 and DER 332 were combined in the amounts indicated in Table 2, and melted together at 300° F. (149° C.). After the mixture melted, the ATPES was added, and agitation was continued at 300° F. (149° C.) until the ATPES dissolved. The mixture was held for 1 to 3 hours to allow the amine groups to react with the epoxy groups.

Step 2—

After the Step 1 reached a desired level, then add the remaining epoxy component (e.g., MX-257) and mixed well. The fumed silica (R816) was added and dispersed using a high-speed mixer. After mixing well, the aluminum powder was added, along with curatives listed in Table 2, and all well-mixed together using high-speed mixer (mixing time limited to no more than 3 mins, and care was taken to ensure that the mixture was not over-heated during mixing).

Step 3—

The mixture from Step 2 was immediately used to draw a film on a silicone-coated liner. A film adhesive was achieved for each of the Examples listed in Table 2.

Panel Preparation

FPL Etched and Phosphoric Acid Anodized Aluminum Substrates

The bare aluminum panel was soaked in OAKITE 165 caustic wash solution for 10 minutes at 85° C. The panel was then immersed in tap water for 10 minutes at 21° C., followed by a continuous spray rinsing with tap water for approximately 3 more minutes. The panel was then immersed in an FPL etch solution for 10 minutes at 66° C., after which the panel was spray rinsed with water for approximately 3 minutes at 21° C., allowed to drip dry for another 10 minutes, then dried in an oven for 30 minutes at 54° C. The etched panel was then anodized in a bath of 85% percent phosphoric acid at 72° F. (22.2° C.) for approximately 25 minutes at a voltage of 15 volts and a maximum current of 100 amps, rinsed with water for approximately 3 minutes at 21° C., allowed to drip dry for another 10 minutes, then dried in an oven for 10 minutes at 66° C. Within 24 hours of being anodized, the aluminum panel was primed with a corrosion inhibiting primer, available under the trade designation "SCOTCH-WELD STRUCTURAL ADHESIVE PRIMER, EC-3917" from 3M Company,

TABLE 2

Formulation of the adhesives (parts by weight)

| Sample | TACTIX 756 | MX-257 | MY-9655 | SU 8 | DER 332 | EPON 828 | EXL-2691 | ATPES | DICY | OTBAF | CAF | 2MA-OK | Aluminum | R816 |
|---|---|---|---|---|---|---|---|---|---|---|---|---|---|---|
| EX-1 | 15 | 30 | 5 | 5 | 9 | 0 | 0 | 3 | 0.5 | 0 | 43 | 0 | 15 | 0 |
| EX-2 | 15 | 30 | 7.0 | 5 | 9 | 0 | 0 | 3.5 | 0.5 | 0 | 34 | 0 | 15 | 1.5 |
| EX-3 | 15 | 25 | 12 | 0 | 6 | 0 | 0 | 4.0 | 0.3 | 0 | 40 | 0 | 16.5 | 1.2 |
| EX-4 | 15 | 25 | 10 | 0 | 0 | 8.0 | 0 | 3.0 | 0.5 | 0 | 40 | 0.15 | 0 | 2.0 |
| EX-5 | 15 | 0 | 10 | 0 | 0 | 24 | 9.5 | 3.0 | 0.5 | 0 | 40 | 0.15 | 0 | 2.0 |
| EX-6 | 15 | 25 | 12 | 0 | 6.0 | 0 | 0 | 4.0 | 0.3 | 0 | 40 | 0 | 18 | 3.0 |
| EX-7 | 15 | 0 | 10 | 0 | 0 | 24 | 0 | 10 | 0.5 | 0 | 40 | 0.15 | 0 | 2.0 |
| EX-8 | 15 | 25 | 10 | 0 | 0 | 8 | 0 | 3.5 | 0.5 | 0 | 40 | 0.2 | 18 | 2.5 |
| EX-9 | 15 | 25 | 10 | 0 | 0 | 8 | 0 | 3.0 | 1.0 | 0 | 36 | 0.3 | 18 | 2.0 |
| EX-10 | 15 | 30 | 10 | 0 | 0 | 6 | 0 | 3.5 | 1.0 | 33 | 0 | 0.25 | 18 | 2.5 |
| EX-11 | 15 | 25 | 9 | 0 | 0 | 9 | 0 | 4.3 | 0.6 | 36 | 0 | 0.3 | 18 | 2.5 |
| EX-12 | 15 | 25 | 9 | 0 | 0 | 9 | 0 | 3.5 | 0.5 | 36 | 0 | 0.2 | 18 | 2.5 |
| EX-13 | 15 | 25 | 9 | 0 | 0 | 9 | 0 | 3.5 | 0.5 | 36 | 0 | 0.15 | 18 | 2.0 |
| EX-14 | 15 | 25 | 10 | 0 | 0 | 8.0 | 0 | 3.0 | 0.5 | 0 | 40 | 0.15 | 18 | 2.0 |
| EX-15 | 15 | 25 | 12 | 0 | 6.0 | 0 | 0 | 6.0 | 1.0 | 0 | 30 | 0.3 | 16.5 | 3.0 |
| EX-16 | 15 | 25 | 12 | 0 | 6.0 | 0 | 0 | 3.5 | 1.0 | 0 | 30 | 0.3 | 16.5 | 3.0 |

Test Methods

Grade 2024T3 bare aluminum panels were obtained from Erickson Metals of Minnesota, Inc., Coon Rapids, Minn. Prior to bonding with structural adhesive, the panels were subjected to one of the following surface preparation processes:

according to the manufacturer's instructions. The dried primer thickness was between 0.1-0.2 mils (2.5-5.1 micrometers).

Overlap Shear Testing for Adhesive Film

Primed panels of 2024-T3 bare aluminum measuring 4 inches long times 7 inches wide times 0.063 inches thick (10.16 cm×17.78 cm×0.16 centimeters) were prepared for testing as described above in "FPL Etched and Phosphoric Acid Anodized Aluminum Substrates". The primed panels were bonded to one another in an overlapping relationship along their lengthwise dimension using a 15.9 mm wide strip of adhesive film. After removing the liner from one side, the adhesive film was applied to the first adherend by hand using a small rubber roller in such a manner as to exclude entrapped air and insure intimate contact between the exposed adhesive and the substrate. After removing the second liner, the second adherend was placed in contact with the exposed adhesive surface to give an assembly with an overlap area of 0.5 inches (12.7 mm). The resulting assembly was fastened together using tape and cured in an autoclave cure cycles described below. The bonded panels were sawn across their width into 1 inch (2.54 cm) wide strips and evaluated for overlap shear strength in accordance with ASTM D-1002 using a grip separation rate of 0.05 inches/minute (1.3 millimeters/minute) using a tensile tester. Six test coupons were prepared and evaluated per each example.

Floating Roller Peel Strength Test for Adhesive Film

Primed panels of 2024-T3 bare aluminum measuring 8 inches long times 3 inches wide times 0.063 inches thick (20.3 times 7.6 times 0.16 centimeters), and 10 inches long times 3 inches wide times 0.025 inches thick (25.4 times 7.6 times 0.064 centimeters), were prepared for testing as described above in "FPL Etched and Phosphoric Acid Anodized Aluminum Substrates". The primed panels were bonded together using the same film adhesive and cure cycle employed for the overlap shear samples, then evaluated for floating roller peel strength in accordance with ASTM D-3167-76 with the following modification. Test strips measuring 0.5 inch (12.7 cm) wide were cut along the lengthwise direction of the bonded aluminum panels. A tensile testing machine operated at a rate of 6 inches/minute (30.5 cm/minute) was used to peel the thinner substrate from the thicker one, and the results normalized to a width of one inch. Five test panels were prepared and evaluated per each example.

Autoclave Curing

Test assemblies as described above were arranged on a caul sheet and bagged in the vacuum bag for the autoclave cure cycle. After applying a vacuum to reduce the pressure in the bag to about 28 inches (Hg), an external pressure about 45 psi (310 kPa) was applied and the temperature of the autoclave was heated from about room temperature (72° F. (22° C.)) to 350° F. (177° C.), at a rate of 4.5° F./minute (2.5° C./minute). The vacuum was released when the pressure reached about 15 psi (103.4 kPa). The final temperature and pressure were maintained for 120 minutes before cooling to room temperature at a rate of 5° F./minute (2.8° C./minute) at which point the pressure was released and a cured joined structure was obtained.

Overlap Shear ("OLS") and Floating Roller Peel ("FRP") test results for Examples 1 to 16 were as listed in Table 3.

TABLE 3

Mechanical performance of the adhesives

| Sample | OLS (psi/MPa) | | FRP (piw/N-25 mm) |
|---|---|---|---|
| | 70° F. (21° C.) | 350° F. (177° C.) | 70° F. (21° C.) |
| EX-1 | 5002/34.5 | 3396/23.4 | 20.5/89.9 |
| EX-2 | 5513/38.0 | 3021/20.8 | 17.8/78.1 |
| EX-3 | ND | 3858/26.6 | 25.4/111 |
| EX-4 | 5028/34.7 | 4021/27.7 | 19.1/83.8 |
| EX-5 | 4873/33.6 | 3357/23.2 | 17.2/75.4 |

TABLE 3-continued

Mechanical performance of the adhesives

| Sample | OLS (psi/MPa) | | FRP (piw/N-25 mm) |
|---|---|---|---|
| | 70° F. (21° C.) | 350° F. (177° C.) | 70° F. (21° C.) |
| EX-6 | ND | 4065/28.0 | 14.1/61.8 |
| EX-7 | 3455/23.8 | 4051/27.9 | 2.0/8.8 |
| EX-8 | 5376/37.1 | 3605/24.9 | 17.6/77.2 |
| EX-9 | 5067/34.9 | 3286/22.7 | 12.0/52.6 |
| EX-10 | 4669/32.2 | 4201/29.0 | 12.1/53.1 |
| EX-11 | 4402/30.4 | 3893/26.8 | 10.0/43.9 |
| EX-12 | 5015/34.6 | 3814/26.3 | 13.0/57.0 |
| EX-13 | 4859/33.5 | 3987/27.5 | 15.8/69.3 |
| EX-14 | 5038 | 3558 | 17.8/78.1 |
| EX-15 | ND | 3638 | 7.99/35.0 |
| EX-16 | ND | 3603 | 10.1/44.3 |

In Table 3, "ND" = not determined

Differential Scanning Calorimetry of Cure (DSC Analysis)

The cure kinetic properties of a composition during curing were determined by placing an amount of the composition (between 5 and 20 mg) in a non-hermetic aluminum pan in a Differential Scanning calorimeter (DSC) and heating from 25 degree C. to 320 degree C. at a heating rate of 10 degree C./min. The DSC instrument was a model Q800 available from TA Instruments, New Castle, Del. The peak cure temperature in degree C. (Peak), the approximate curing onset temperature in degree C. (Onset), and the total energy released (Energy) in Joules/gram (J/g) during curing of the composition from the DSC trace are reported. The Energy corresponds with the peak exotherm on the trace.

FIG. 1 shows DSC data for EX-1, EX-14, and EX-16. The data were consistent with showing a lower cure temperature for samples with an imidazole (i.e., inclusion of 2MAOK in EX-14 and EX-16) than without the imidazole (EX-1). It is also apparent from FIG. 1 that there was a biphasic curve for EX-14 and EX-16.

Figure 2:
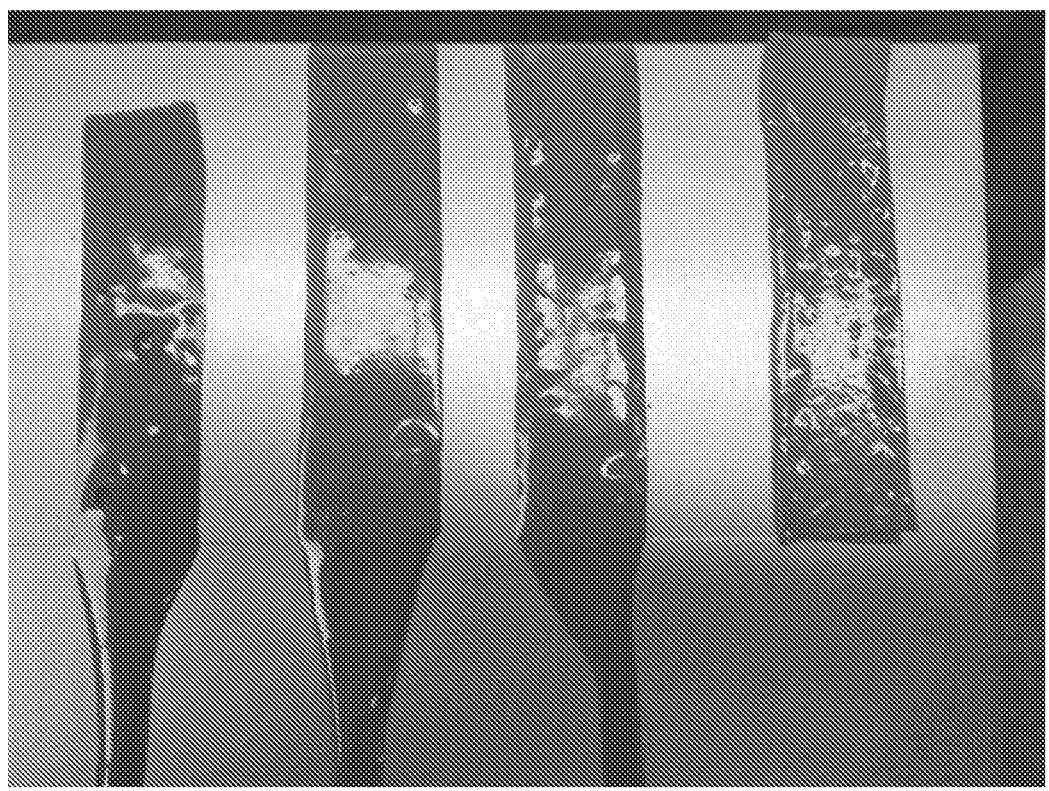
FIG. 2 is a photograph showing the physical behavior of certain curable compositions upon heating.

As shown in FIG. 2 (showing from left to right: EX-1, EX-2, EX-3, and EX-16), when the formulation did not include the imidazole material in the formulation (see EX-1, EX-2, and EX-3 in FIG. 2), the film began to sag in a temperature range of from 110° C. to 150° C. Using both imidazole and DICY as co-curatives (as in EX-16), the formulation cured comparatively more in the 110° C. to 150° C. temperature range.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A curable composition comprising a reactive mixture of components comprising:
    a polyethersulfone having a chemical group reactive with an epoxide;
    a cycloaliphatic polyepoxide resin;
    a polyepoxide having a functionality greater than two;
    a liquid diepoxide resin;
    a first curative comprising 9,9-bis(aminophenyl)fluorene or derivative therefrom, the first curative being present in an amount of from 2% to 50% by weight, based on the overall weight of the curable composition;

a second curative comprising dicyandiamide and present in an amount of from 0.01% to 5% by weight, based on the overall weight of the curable composition; and an accelerator comprising an imidazole and present in an amount of from 0.01% to 2% by weight, based on the overall weight of the curable composition.

2. The curable composition of claim 1, wherein the polyethersulfone comprises an amine-terminated polyethersulfone.

3. The curable composition of claim 1, wherein the polyethersulfone is present in an amount of from 0.1% to 20% by weight, based on the overall weight of the curable composition.

4. The curable composition of claim 1, wherein the components further comprise a plurality of core shell particles, each core shell particle comprising an elastomeric core and a polymeric outer shell layer disposed on the elastomeric core.

5. The curable composition of claim 1, wherein the components further comprise an inorganic filler having a density of at least 2 g/cm$^3$.

6. The curable composition of claim 5, wherein the inorganic filler comprises aluminum powder.

7. The curable composition of claim 6, wherein the aluminum powder is present in an amount of up to 50% by weight based on the overall weight of the curable composition.

8. An adhesive film comprising:

a first curative comprising 9,9-bis(aminophenyl)fluorene or derivative therefrom, the first curative being present in an amount of from 2% to 50% by weight, based on the overall weight of the curable composition;

a second curative comprising dicyandiamide and present in an amount of from 0.01% to 5% by weight, based on the overall weight of the curable composition; and an accelerator comprising an imidazole and present in an amount of from 0.01% to 2% by weight, based on the overall weight of the curable composition, wherein the adhesive film resists sagging when adhered to a vertical substrate and heated to a temperature of from 50° C. to 250° C.

9. A method of bonding the adhesive film of claim 8 to a substrate, the method comprising:

applying the adhesive film to the substrate;

heating the adhesive film to a temperature above a first temperature of from 60° C. to 180° C. to partially cure the adhesive film; and further heating the adhesive film to a temperature above a second temperature of from 150° C. to 200° C., wherein the difference between the first and second temperatures is from 10° C. to 100° C., to fully cure the adhesive film.

10. A method of bonding a honeycomb structure to a skin, the method comprising:

providing an adhesive film according to claim 8 a second curative;

applying the adhesive film to at least one of the honeycomb structure and the skin;

heating the adhesive film to a temperature above the first temperature to partially cure the adhesive film; and further heating the adhesive film to a temperature above the second temperature to fully cure the adhesive film, wherein the adhesive film resists sagging when adhered to a vertical substrate and heated to a temperature of from 50° C. to 250° C.

* * * * *